US009178675B2

(12) United States Patent
Kenney et al.

(10) Patent No.: US 9,178,675 B2
(45) Date of Patent: Nov. 3, 2015

(54) CHANNEL ESTIMATION AND TRACKING

(71) Applicant: Intel Corporation, Santa Clara, CA (US)

(72) Inventors: Thomas J. Kenney, Portland, OR (US); Eldad Perahia, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 203 days.

(21) Appl. No.: 13/628,613

(22) Filed: Sep. 27, 2012

(65) Prior Publication Data

US 2013/0223359 A1 Aug. 29, 2013

Related U.S. Application Data

(60) Provisional application No. 61/603,449, filed on Feb. 27, 2012.

(51) Int. Cl.
*H04L 27/26* (2006.01)
*H04L 5/00* (2006.01)
(Continued)

(52) U.S. Cl.
CPC ............ *H04L 5/005* (2013.01); *H04L 25/0224* (2013.01); *H04L 25/03019* (2013.01); *H04W 84/12* (2013.01)

(58) Field of Classification Search
CPC ............... H04L 25/0224; H04L 25/03019; H04L 27/06; H04L 1/00; H04L 5/0048; H04L 5/003; H04L 5/005; H04W 84/12; H04W 72/04; H04B 1/38

USPC ......... 370/203, 208, 210, 241, 260, 339, 252, 370/328–329; 375/260, 267; 455/434, 455/450–452.1, 458, 464–502, 509, 455/515–516, 702
See application file for complete search history.

(56) References Cited

U.S. PATENT DOCUMENTS 7,522,514 B2 * 4/2009 Tzannes et al. ............... 370/210
8,649,447 B2 * 2/2014 Mohebbi ....................... 375/260
(Continued)

FOREIGN PATENT DOCUMENTS

EP 725495 A2 * 7/1996

OTHER PUBLICATIONS

International Preliminary Report on Patentability and Written Opinion for PCT Application No. PCT/US2013/025943, mailed on Sep. 12, 2014, 8 pages.

(Continued)

*Primary Examiner* — Charles C Jiang
*Assistant Examiner* — Mohamed Kamara
(74) *Attorney, Agent, or Firm* — Shichrur & Co.

(57) ABSTRACT

A platform to facilitate updating an equalizer in addition to other receiver functionality is disclosed. A transmitting entity transmits one or more pilot tones in each protocol data unit (PDU) such as a packet. A receiving entity is able to derive a sufficiently accurate channel response estimate with the pilot tones under most channel conditions. The method and apparatus rotates the pilot tones through each of the subcarriers over the packet. The pilot tones would be separated by some number of data subcarriers so that estimation of slope and intercept for subcarrier tracking could be maintained. As the pilot tones are swept across the subcarriers, the taps for the equalizer for the subcarriers for which the pilot tones currently populate would be updated as well. This approach allows the system to track channel changes over time.

33 Claims, 7 Drawing Sheets

(51) Int. Cl.
*H04L 25/02* (2006.01)
*H04L 25/03* (2006.01)
*H04W 84/12* (2009.01)

(56) References Cited

U.S. PATENT DOCUMENTS

| | | | |
|---|---|---|---|
| 2003/0053410 A1* | 3/2003 | Williams et al. | 370/207 |
| 2003/0103445 A1* | 6/2003 | Steer et al. | 370/208 |
| 2003/0128656 A1 | 7/2003 | Scarpa | |
| 2005/0265218 A1* | 12/2005 | Molisch et al. | 370/203 |
| 2006/0172704 A1 | 8/2006 | Nishio et al. | |
| 2007/0147520 A1 | 6/2007 | Li et al. | |
| 2007/0165726 A1 | 7/2007 | Ding et al. | |
| 2007/0189406 A1* | 8/2007 | Kim et al. | 375/260 |
| 2008/0095226 A1 | 4/2008 | Bar-Ness et al. | |
| 2008/0165672 A1 | 7/2008 | Ku et al. | |
| 2008/0232239 A1 | 9/2008 | Mujtaba et al. | |
| 2008/0273510 A1* | 11/2008 | Mudulodu et al. | 370/339 |
| 2009/0060075 A1 | 3/2009 | Mohebbi | |
| 2009/0257411 A1* | 10/2009 | Shitara | 370/336 |
| 2010/0034311 A1* | 2/2010 | Hasegawa | 375/267 |
| 2010/0054194 A1 | 3/2010 | Chauncey et al. | |
| 2010/0329394 A1* | 12/2010 | Bae et al. | 375/340 |
| 2011/0116516 A1 | 5/2011 | Hwang et al. | |
| 2011/0216808 A1 | 9/2011 | Tong et al. | |
| 2012/0020427 A1 | 1/2012 | Butussi et al. | |
| 2012/0082252 A1* | 4/2012 | Annavajjala et al. | 375/260 |
| 2013/0070605 A1* | 3/2013 | Ghosh et al. | 370/241 |

OTHER PUBLICATIONS

International Preliminary Report on Patentability and Written Opinion for PCT Application No. PCT/US2013/027782, mailed on Sep. 12, 2014, 6 pages.

International Search Report and Written Opinion for PCT Patent Application No. PCT/US2013/025943, mailed on Jun. 21, 2013, 11 pages.

International Search Report and Written Opinion for PCT Patent Application No. PCT/US2013/027782, mailed on Jun. 14, 2013, 9 pages.

Sofer, et al., "Deployment Scenarios with reuse 1 (utilizing FUSC and PUSC concept)", IEEE 802.22-06/0109r2, Jul. 9, 2006, 16 pages.

Office Action for U.S. Appl. No. 13/725,549, mailed on Sep. 19, 2014, 19 pages.

Office Action for U.S. Appl. No. 14/325,936, mailed on Oct. 16, 2014, 20 pages.

Final Office Action for U.S. Appl. No. 13/725,549, mailed on Feb. 24, 2015, 22 pages.

Final Office Action for U.S. Appl. No. 14/325,936, mailed on Apr. 3, 2015, 26 pages.

Extended Search Report for European Patent Application No. 13755889.6, mailed on Feb. 27, 2015, 6 pages.

* cited by examiner

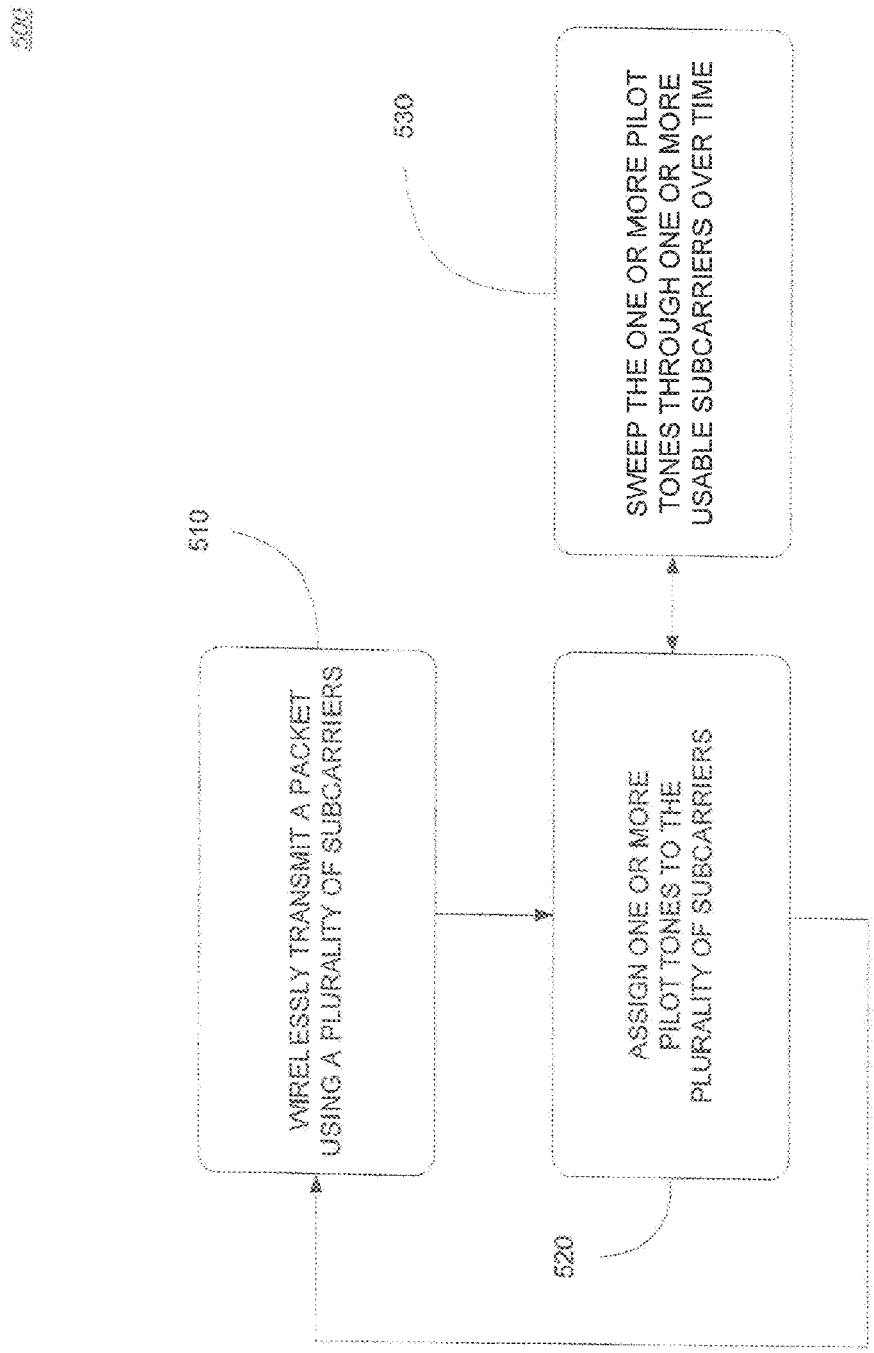

CHANNEL ESTIMATION AND TRACKING

This application claims priority to U.S. Provisional Application No. 61/603,449 entitled "IMPROVED CHANNEL ESTIMATION AND TRACKING," filed Feb. 27, 2012, the disclosure of which is incorporated herein by reference in its entirety.

BACKGROUND

1. Field of the Disclosed Embodiments

The present invention relates generally to wireless communications and more particularly to a method and apparatus for transmitting and receiving pilot tones.

2. Introduction

Sensor networks have numerous applications, such as security, industrial monitoring, military reconnaissance, and biomedical monitoring. In many such applications, it is either inconvenient or impossible to connect the sensors by wire or cable; a wireless network is preferable. Sensor networks may be implemented indoors or outdoors. Seismic sensors, for example, may be used to detect intrusion or movement of vehicles, personnel, or large earth masses.

The detection of vehicles and personnel is more difficult than detecting large signals, as from earthquakes or movement of earth masses. The reliable detection or tracking over large areas thus requires very large numbers of sensitive detectors, spaced closely. Although placing sensor nodes in the environment is relatively easy, and configuring them in a network is manageable, a problem faced by sensor networks is that determining where they are in geographic coordinate locations is difficult and expensive. A wireless network of numerous sensitive, low cost, low-powered sensor stations is more desirable. However, the resulting overhead for channel estimation is usually prohibitive in a wireless sensor network.

A wireless communications standard is being developed by the Institute of Electrical and Electronics Engineers (IEEE) 802.11ah (11ah) task group. IEEE 802.11ah (11ah) is a new technology evolution for WiFi and is in the standards development phase; very low data rate operation is being enabled. In IEEE 802.11a/g, 20 MHz channel widths were defined and in IEEE 802.11n 40 MHz was added and then in IEEE 802.11ac both 80 and 160 MHz. In the past the evolution of WiFi has been to increase data rate, but IEEE 802.11ah (11ah) actually targets comparatively lower rate services.

BRIEF DESCRIPTION OF DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 is a flowchart of a method for tone allocation in a transmitter in accordance with an embodiment.

DETAILED DESCRIPTION OF THE DISCLOSED EMBODIMENTS

Figure 1A:
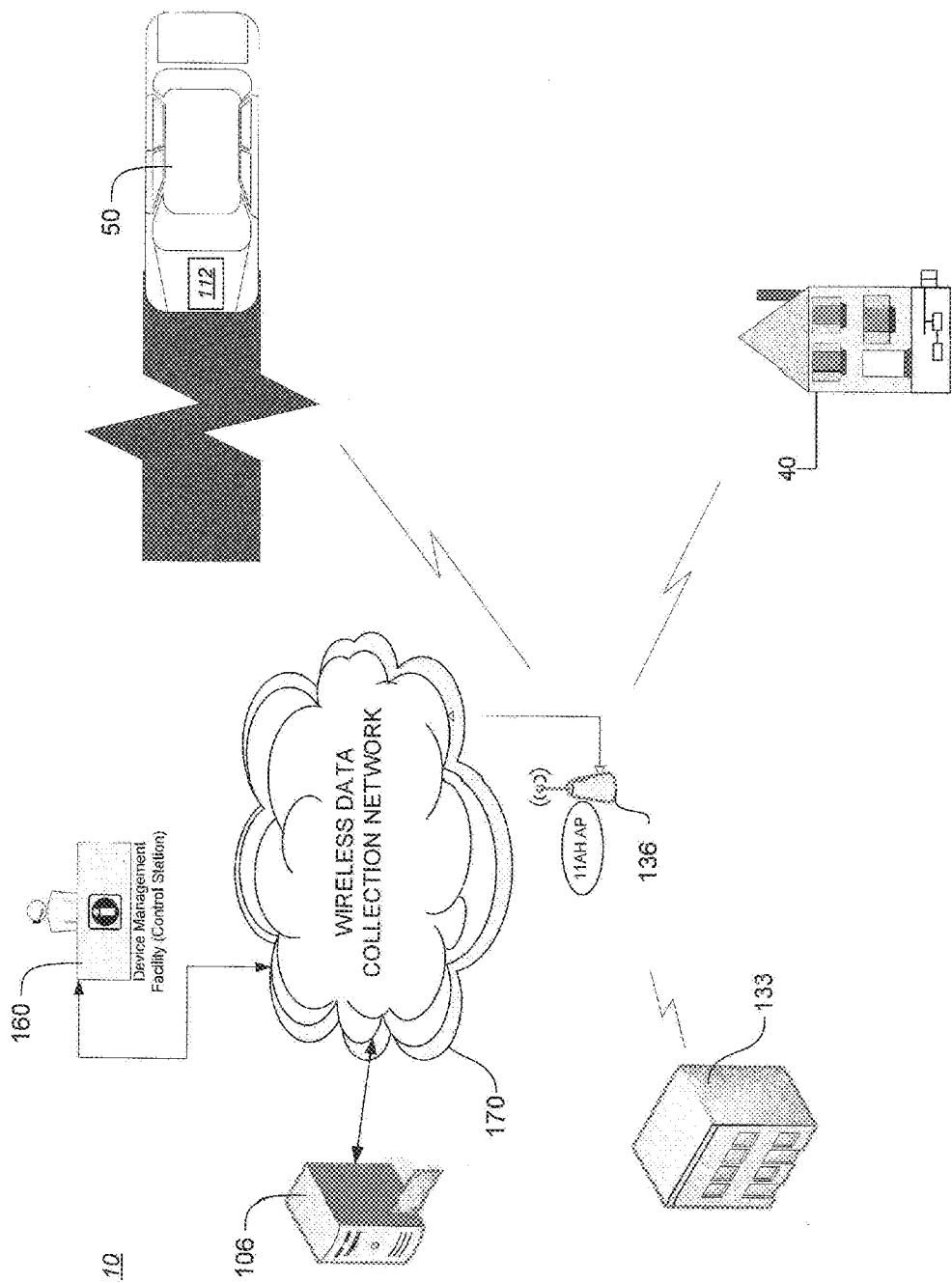
FIG. 1A illustrates the concept of sensor network deployment in accordance with an embodiment.

There is a need for an approach where a platform may facilitate updating an equalizer. A transmitter transmits one or more pilot tones in each OFDM symbol set and there are typically protocol data unit (PDU), or packet. A receiver derives a sufficiently accurate channel response estimate with the one or more pilot tones under most channel conditions. According to embodiments, the pilot tones may be rotated through each of the subcarriers over the packet. The pilot tones could, for example, be separated by a number of data subcarriers so that estimation of slope and intercept for subcarrier tracking could be maintained. As the pilot tones are swept across the band, the taps for the equalizer for the subcarriers for which the pilot tones currently populate would be updated as well. This approach allows the system to track channel changes over time.

According to one embodiment, a method comprises wirelessly transmitting a packet using a plurality of subcarriers; and sequentially assigning one or more pilot tones to one or more of the plurality of subcarriers during a time period of the packet so that a communication system receiving the packet can track channel changes over time.

According to another embodiment, an apparatus comprises a transmission channel to wirelessly transmit a packet using a plurality of subcarriers, wherein the transmission channel sequentially assigns one or more pilot tones to one or more of the plurality of subcarriers during a time period of the packet; and a channel estimation module coupled to an input module and configured to calculate channel estimates of the transmission channel from the one or more pilot tones; wherein sequentially assigning one or more pilot tones allows a system receiving the packet to track transmission channel changes over time.

According to yet another embodiment, the channel estimation module in an apparatus comprises equalizer taps, the equalizer taps having an input coupled to an adaptive algorithm process and the equalizer taps having an equalizer coefficients output coupled to generate channel changes.

According to another embodiment, a non-transitory machine-accessible medium provides instructions, which when accessed, cause a machine to perform operations, the non-transitory machine-accessible medium comprising code to cause at least one computer to wirelessly transmit a packet using a plurality of subcarriers and to sequentially assign one or more pilot tones to one or more of the plurality of subcarriers during a time period of the packet; and code to cause at least one computer, in a channel estimation module coupled to an input module, to calculate channel estimates of a transmission channel from the one or more pilot tones; wherein sequentially assigning one or more pilot tones allows a system receiving the packet to track transmission channel changes over time.

Exemplary embodiments are described herein. It is envisioned, however, that any system that incorporates features of any apparatus, method and/or system described herein are encompassed by the scope and spirit of the exemplary embodiments.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

An algorithm, technique or process is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Although embodiments of the invention are not limited in this regard, discussions utilizing terms such as, for example, "processing," "computing," "calculating," "determining," "applying," "receiving," "establishing," "analyzing," "checking," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of resistors" may include two or more resistors.

The term "controller" is used herein generally to describe various apparatus relating to the operation of one or more devices that direct or regulate a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions.

The term "wireless device" as used herein includes, for example, a device capable of wireless communication, a communication device capable of wireless communication, a mobile terminal, a communication station capable of wireless communication, a portable or non-portable device capable of wireless communication, mobile terminal, or the like.

As used herein, the term "network" is used in its broadest sense to mean any system capable of passing communications from one entity to another. Thus, for example, a network can be, but is not limited to, a wide area network, a WiFi network, a cellular network, and/or any combination thereof.

As used herein, a "sensor network" is a wireless or wired network of nodes in which at least some of the nodes collect sensory data. A wireless sensor network (WSN) is a wireless network consisting of spatially distributed sensors to cooperatively monitor physical or environmental conditions. In many situations, a plurality, majority or even all of the nodes in a sensor network collect sensory data. Sensory data may include external sensory data obtained by measuring/detecting natural sources such as temperature, sound, wind, seismic activity or the like. Sensory data may also include external sensory data obtained by measuring/detecting man-made sources such as light, sound, various frequency spectrum signals, and the like. Sensory data may alternatively include data related to measuring/detecting sources internal to a sensor node (e.g., traffic flow on a network, and the like).

In IEEE 802.11ah (11ah), which is a new technology evolution for WiFi, and is in the standards development phase, very low data rate operation is being enabled. In IEEE 802.11a/g, 20 MHz channel widths were defined and in IEEE 802.11n 40 MHz was added and then in IEEE 802.11ac both 80 and 160 MHz. In the past, the evolution of WiFi has been to increase data rate, but IEEE 802.11ah actually targets comparatively lower rate services. In IEEE 802.11ah, the bandwidths defined are 1 MHz and a set of down-clocked IEEE 802.11ac rates, namely 2, 4, 8 and 16 MHz, where the down clocking is 10×. The 1 MHz rate is not derived from the IEEE 802.11n/ac rates, and thus this bandwidth mode is being designed more or less independently. Thus far in the process, the 1 MHz system is likely to use a 32 point FFT (as opposed to the minimum of 64 in IEEE 802.11ac). Of those 32 subcarriers, it is likely that 24 will be used for data and 2 for pilot. Additionally, a repetition mode is being included, which further lowers the data rate. It should be emphasized that these tone counts could change if performance requirements necessitate.

The identified target applications for IEEE 802.11ah are indoor and outdoor sensors (sensor network) and cellular offloading. It is likely the main application will be sensor networks, e.g., smart metering. The measure information at each node should be delivered to a fusion center like an access point. In any case, in most instances the payload is anticipated to be small (hundreds of bytes), but there are several use cases that have rather large payloads (a few thousand bytes). In these later cases, due to the low data rates of the IEEE 802.11ah system, a packet can exceed 100 milliseconds. In comparison, for the IEEE 802.11n/ac system, a packet length of 2400 bytes transmitted at the lowest rate takes 3.2 ms, using the highest MCS this reduces to 0.3 ms and this is for only 1 stream. For these durations and the fact that the system was largely designed for indoor use, the channel is assumed stationary over the packet duration. With IEEE 802.11ah, which has a much lower data rate, and has use cases targeting outdoor, this assumption of channel stationarity is no longer valid.

The packet structure in previous versions of WiFi all have a preamble of fixed duration and a few pilot tones at fixed locations. The number of pilot tones and their location is different for the four (4) different bandwidths of IEEE 802.11ac, but for each of the bandwidths they are fixed. The issue with potentially long packets in IEEE 802.11ah is that in outdoor channels, the channel is not stationary over the packet. Thus additional equalizer training or pilot phase tracking using different pilot locations has been deemed desirable.

The approach to solve the problem was to arrive at a solution that would minimize the changes to the transmitter (Tx) and receiver (Rx) architecture from that of the previous IEEE 802.11a/g/n/ac versions. The solution outlined in this description is to use the pilot tones to continually update the equalizer, in addition to other receiver functionality. As noted above, in current versions of the standard the packets are relatively short in time. So the use of a preamble was justified and, assuming a stationary channel, was efficient from an overhead perspective. Also, with IEEE 802.11ah, where relatively low data rates are possible (using the lowest MCS's and single stream transmissions), which make the packet longer in time, and where outdoor usage models are contemplated, this channel stationarity assumption is no longer valid.

In previous versions of the standard, the preamble is typically used to estimate initial receiver parameters such as frequency offset estimation, timing estimation and such, in addition to computing the equalizer taps. The pilot tones were then typically used for tracking through the packet to maintain and improve frequency, time and phase estimation. To do that, the pilot tones are currently assigned to OFDM subcarriers in a fixed manner and then from there techniques are used to estimate these parameters across the band as needed. An example of a possible configuration 190 for IEEE 802.11ah with fixed pilot tones at tone locations (+7,−7) is shown in FIG. 1C.

In addition, various types of communication systems may employ one or more of various types of signaling (e.g., orthogonal frequency division multiplexing (OFDM), code division multiple access (CDMA), synchronous code division multiple access (5-CDMA), time division multiple access (TDMA), and the like) to allow more than one user access to the communication system. In accordance with processing signals transmitted across a communication channel within such communication systems, one function that is often performed is that of channel estimation. From certain perspectives, channel estimation (variant definitions such as channel detection, channel response characterization, channel frequency response characterization, and the like) is an instrument by which at least some characteristics of the communication channel (e.g., attenuation, filtering properties, noise injection, and the like) can be modeled and compensated for by a receiving communication system.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

The sensor network and the multi-band capable station illustrated in FIG. 1A and the related discussion are intended to provide a brief, general description of a suitable computing environment in which the invention may be implemented. Although only three stations (STAs) are shown for simplicity, the invention is not limited to any particular number of STAs.

FIG. 1A illustrates a sensor network 10 in accordance with an embodiment. A wireless sensor network can be defined as a network of devices, denoted as nodes, which are capable of sensing the environment and communicating the information gathered from the monitored field, e.g., an area or volume, through wireless links. The data is forwarded, possibly via relays, to a controller or monitor (sink) that can use it locally or is connected to other networks, like the Internet, through a gateway. The nodes can be stationary or moving. They can be aware of their location or not. They can be homogeneous or not. A preferred embodiment of the present invention provides a sensor network, illustrated in FIG. 1A, as a flexible open architecture that serves as a communication platform for multiple deployment scenarios and sensor types. Sensors may track, for example, one or more intrusion, unauthorized, medical, or meter events. For example, a chemical sensor may take an air sample and measure its properties, or a temperature sensor can measure temperature of buildings, cars, people, objects, and the like. A network according to a preferred embodiment, can be deployed to cover an area, indoor or outdoor, or deployed locally in rapid response emergency situations. Sensors can be placed in various fixed or mobile locations. Typical fixed locations include buildings, poles/towers for power or telephone lines or cellular towers or traffic lights. Typical mobile locations include vehicles such as autos, individuals, animals such as pets, or movable fixed locations.

The illustrated sensor network 10 comprises a device management facility/computer 160, a plurality of access points (AP) such as AP 136, also labeled 11ah AP to show that it is 11ah compliant, and a plurality of sensor nodes or stations (STAs) such as sensor node 40 in a customer premise to perform smart metering functions, sensor node 50 to monitor vehicle functions, sensor node 106, and sensor node 133. A wireless data collection network 170 node is shown within the network (wireless sensor network 10) to provide reachback links to existing public or private infrastructure types such as cellular, land mobile radio, and wired or wireless access points. A wireless data collection network 170 works as both a sensor network data concentrator as well as a reachback vehicle with existing communication infrastructures like land mobile radio, cellular, broadband data, and the like. In essence, it provides transparent communications across different physical layers. The plurality of sensor nodes are positioned over a sensing region, and may be individually identified as sensor nodes $STA_1, STA_2, \ldots STA_N$. Any particular sensor node of the plurality of sensor nodes is able to communicate with one or more other sensor nodes, so as to form relay paths to one or more of the AP nodes such as AP 136. The sensor network 10 includes one or more communication devices 112 configured to establish a wireless and/or wired communication link across wireless data collection network 170 with one or more remote application servers. The communication devices 112 may include a desktop, a laptop, and/or a mobile computing device. Examples of mobile computing devices include, but are not limited to, a Smartphone, a tablet computer, and ultra-mobile personal computers.

Device management facility/computer 160 may be located within one of the AP nodes such as AP 136, or on a server, a laptop computer, a personal digital assistant (PDA), Smartphone, or a desktop computer. Functions performed by device management facility/computer 160 may in actual practice be located on one computer, or distributed across several computers with different programs to perform assigned individual functions. AP nodes such as AP 136 are typical of that known in the art. AP nodes serve as the gateway between some or all of the sensor nodes and the rest of the world, e.g., via the Internet. An 11ah compliant AP is capable of exchanging information with indoor and outdoor sensors and cellular offloading. In any case, in most instances, the payload is anticipated to be small (hundreds of bytes), but there are several use cases that have rather large payloads (a few thousand bytes). In these later cases, due to the low data rates of the 11ah system, a packet can exceed 100 milliseconds. With 11ah, which has a much lower data rate, and has use cases targeting outdoor, this assumption of channel stationarity is no longer valid and thus additional equalizer training or pilot phase tracking using different pilot locations has been deemed necessary.

Figure 1B:
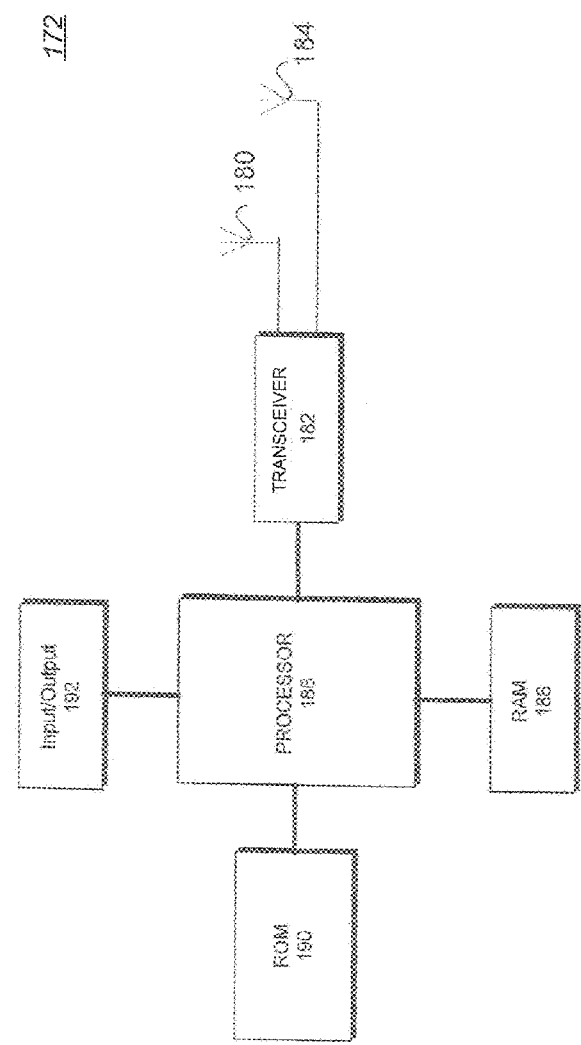
FIG. 1B is an exemplary communication device suitable for implementing different embodiments of the disclosure.
Figure 1C:
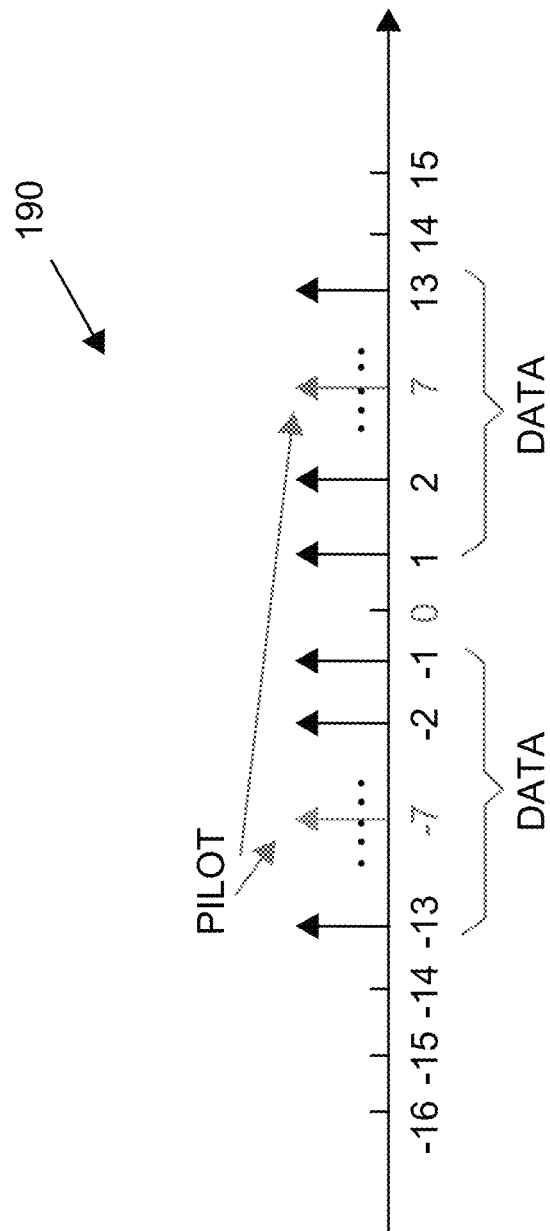
FIG. 1C illustrates a possible tone allocation for IEEE 802.11ah using fixed pilots.

FIG. 1B illustrates an exemplary communication device 172 suitable for implementing different embodiments of the disclosure. The exemplary communication device 172 may be at least one of the one or more communication devices 112 described above with reference to FIG. 1A. The exemplary communication device 172 may include a processor 186 that is coupled to one or more memory devices, such as a read only memory (ROM) 190 and a random access memory (RAM) 188, and at least one transceiver 182 that may be coupled to one or more antennas, such as a first antenna 180 and a second antenna 184, and an input/output (I/O) device 192. The processor 186 may be implemented as one or more processor chips.

Processor 186 may include, for example, a Central Processing Unit (CPU), a Digital Signal Processor (DSP), a microprocessor, a controller, a chip, a microchip, an Integrated Circuit (IC), or any other suitable multi-purpose or specific processor or controller. Processor 186 may, for example, process data received by the exemplary communication device 172, and/or process data intended for transmission.

The ROM 190 is used to store instructions and perhaps data which are read during program execution. ROM 190 is a non-volatile memory device. The RAM 188 is used to store volatile data and perhaps to store instructions. The ROM 190 may include flash memories or electrically erasable programmable memory to support updating the stored instructions remotely, for example, through an over-the-air interface via the at least one transceiver 182 and the one or more antennas, such as the first antenna 180 and the second antenna 184.

The at least one transceiver 182, and the antennas 180, 184 support radio communications. The at least one transceiver 182, via one or both of antennas 180 and 184, is able to perform separate or integrated functions of receiving and/or transmitting/receiving wireless communication signals, tones, blocks, frames, transmission streams, packets, messages and/or data.

The I/O device 192 may be a keypad and a visual display to permit entering numbers and selecting functions. Alternatively, the I/O device 192 maybe a keyboard and a touch pad, such as a keyboard and a touch pad of a laptop computer. The processor 186 executes instructions, codes, computer-executable instructions, computer programs, or scripts, which it accesses from ROM 190 or RAM 188.

Figure 2:
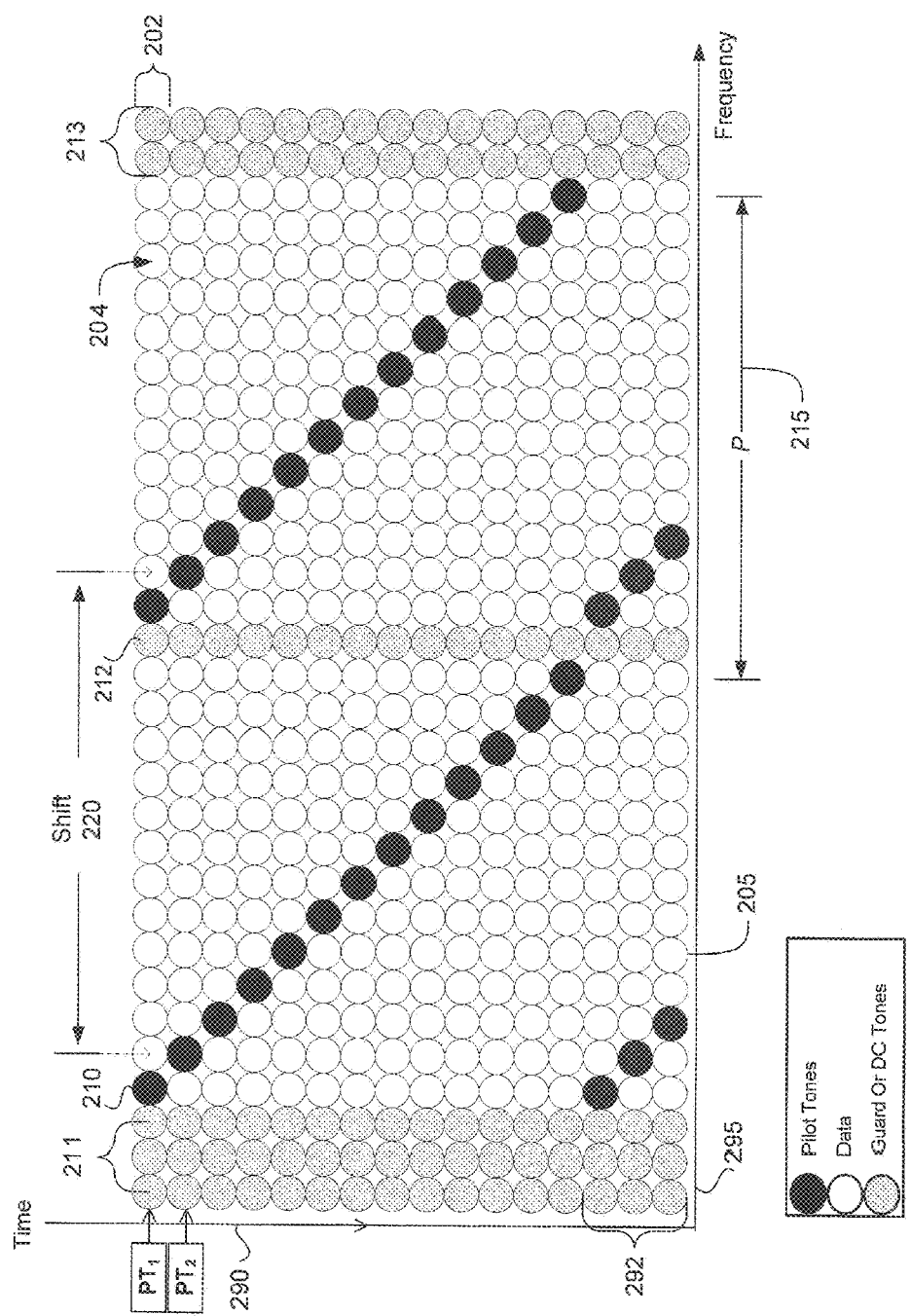
FIG. 2 is a diagram of a packet/frame with pilot tones transmitted by a transmitter in accordance with an embodiment.
Figure 3:
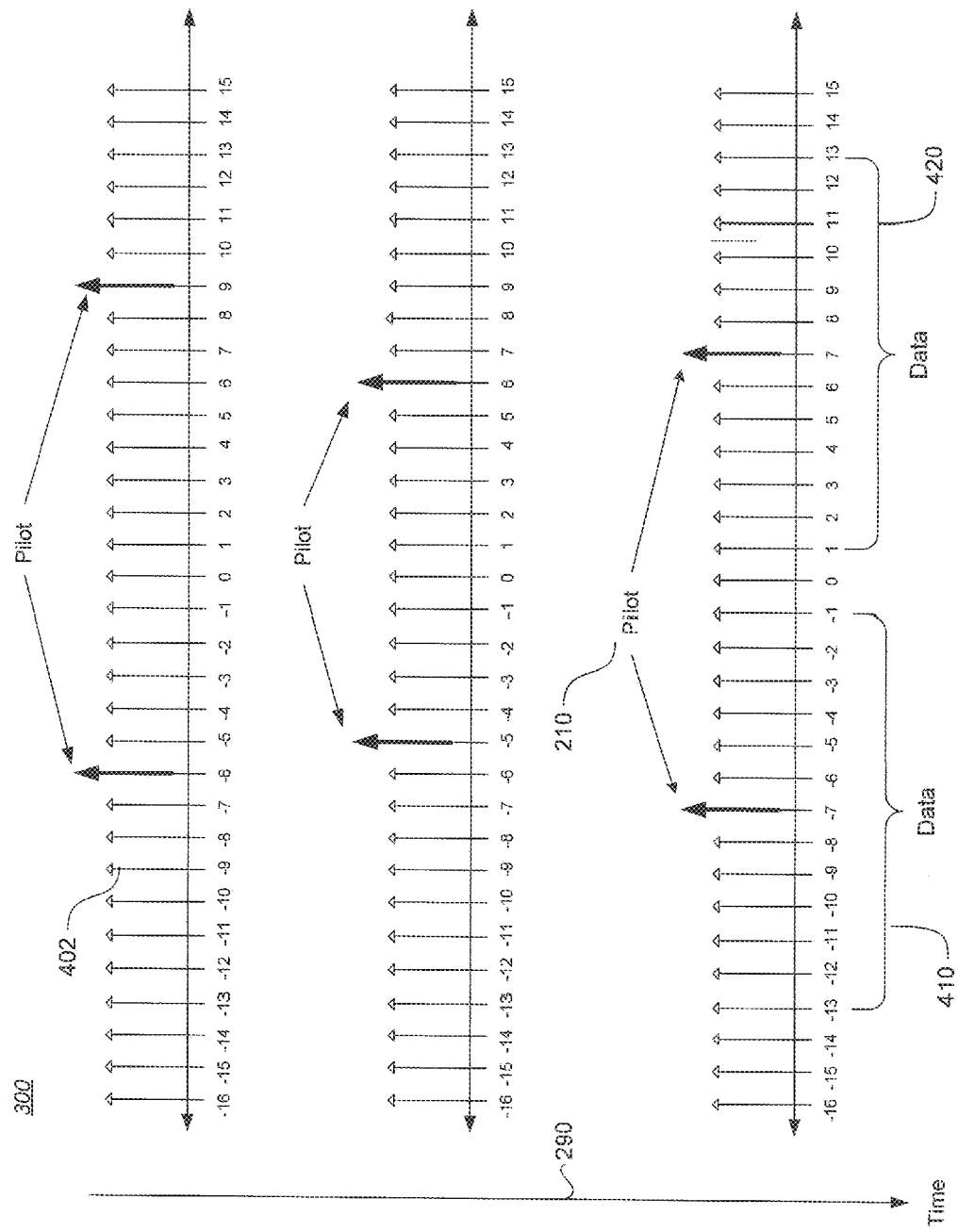
FIG. 3 illustrates a method for pilot tone shifting in an orthogonal frequency division multiplexing (OFDM) based communication system in accordance with an embodiment.

FIG. 2 is a diagram of a packet with pilot tones transmitted by a transmitter in accordance to an embodiment. FIG. 2 shows a signal that comprises an OFDM symbol set 202. Each of the OFDM symbol sets includes multiple data symbols modulated by distinct subcarrier frequencies 204. Each OFDM symbol set includes pilot tones 210, data symbols 205, guard subcarriers 211 and 213, and DC subcarriers (0 Hz) 212 although other configurations are possible. The DC and guard subcarriers are sometimes collectively called the null subcarriers/tones (null tones). Null tones are used in OFDM systems to protect against DC offset t. (DC subcarrier), and to protect against adjacent channel interference (guard subcarriers). Additionally, guard subcarriers are left blank to allow for fitting the transmitted waveform into a transmit spectral mask with less costly implementation. The pilot tones according to embodiments may be assigned to one or more usable subcarriers (i.e., subcarriers not including guard or DC tones) such that, as shown by way of example in FIG. 2, they sweep through the usable subcarriers, such as through all usable subcarriers, as a function of time. The pilot tones 210 may be modulated by the same subcarrier frequency in each of the OFDM symbol sets but disposed at different subcarrier positions in different symbol sets. In a sequential assignment of pilot tones, difference in position (P), spacing 215, between the pilot tones in the same symbol sets may be such that every n (n>=1) symbol position in a symbol set is occupied by a pilot tone. As shown, the spacing between the pilot tones may be fourteen (14) subcarriers and this fixed position may be maintained for each symbol set. FIG. 3 illustrates an alternative strategy where the spacing varies because a random assignment is employed on the positioning of the pilot tones.

The pilot tones are disposed at different subcarrier positions in different symbol sets through time through pilot tone shifting. Pilot tone shifting is a process where the pilot tones are sequentially or randomly assigned to different subcarriers as a function of time. As previously mentioned, only a subset of subcarriers may be used for pilot tones or data purposes (usable subcarriers). For example, the pilot tones may be used only on data subcarriers (e.g., sweep through with the pilot tone on a symbol by symbol basis), avoid nulled subcarriers (e.g., DC subcarriers and guard subcarriers), and potentially even avoid data tones that are adjacent to guard or DC subcarriers. The pilot tones and their positioning can be based on channel conditions such as coding scheme, packet length, and the like. As shown on time axis 290, $PT_1$ (time=1 or a first time period of the packet) the position of the pilot tones are −13 and 1; while at $PT_2$ (time=2) the positions are shifted by one and the pilot tones are assigned to −12 and 2. As shown the pilot tones 205 are shifted 220 one position in the time domain. The pilot tones could be shifted such that there is a shift every symbol set as shown, or could stay fixed for several symbol sets and then be shifted. The shifting of the pilot tones 210 can be based on the modulation and coding scheme (MCS) used for transmission or on the packet length of the transmission (i.e., channel conditions). Further, the amount of time the one or more pilot tones 210 occupy at a particular subcarrier could be based on a modulation and coding scheme (MCS), the MCS selected based on a data rate and a level of robustness required by traffic type. After a set of pilot tones are assigned, the process 292 of assigning pilot tones is repeated for each time period of a plurality of time periods.

FIG. 3 illustrates a method 300 for random pilot tone shifting as function of time in an OFDM-based communication system in accordance with an embodiment. This diagram shows multiple frames, at different times, of an OFDM signal with each frame including pilot tones 210, data tones 410 and 420, and null tones, which are generally found at (−16, −15, 0, 14, and 15) for this 1 MHz bandwidth case example. While in a wireless network sensor a uniform modulation is used for all the data tones, an OFDM signal may comprise data tone 402 of different modulation types. Examples of different modulation types are Quadrature phase-shift keying (QPSK) and Binary phase-shift keying (BPSK), which is of a relatively lower modulation order than QPSK. In FIG. 3, tone set (tones −12 and −11) may use a QPSK modulation type and there may be an even greater confidence associated with a symbol extracted from that data tone to qualify it as a pseudo-pilot tone. Tone set (tones 10 and 11) could be data tones whose corresponding symbols have relatively lower modulation order types (such as below 64 QAM, e.g., 16 QAM, BPSK, and the like) that may qualify more frequently for pilot tone insertion than data tones whose corresponding symbols have relatively higher modulation order types like QPSK.

Additionally, the amount of time the pilot tones occupy a particular subcarrier could be dependent on a modulation and coding scheme (MCS). For example in .11ah, where a new BPSK rate ½ mode is defined with a repetition coding of 2×, the fixed duration could be longer than that of the MCS0, BPSK rate ½ mode, which has no repetition. Finally, the approach allows the system to use fixed pilot tones for packets which are short in duration as in previous versions of the standard so as to minimize the processing. Thus, it allows the option of using the technique in all packet transmissions, or to only be used for configurations such as low MCS's with 1-stream and large payloads. Using MCS and packet length to determine the setting for the pilot rotation allows a simple design since these parameters are signaled in the preamble in the signal field(s).

Figure 4:
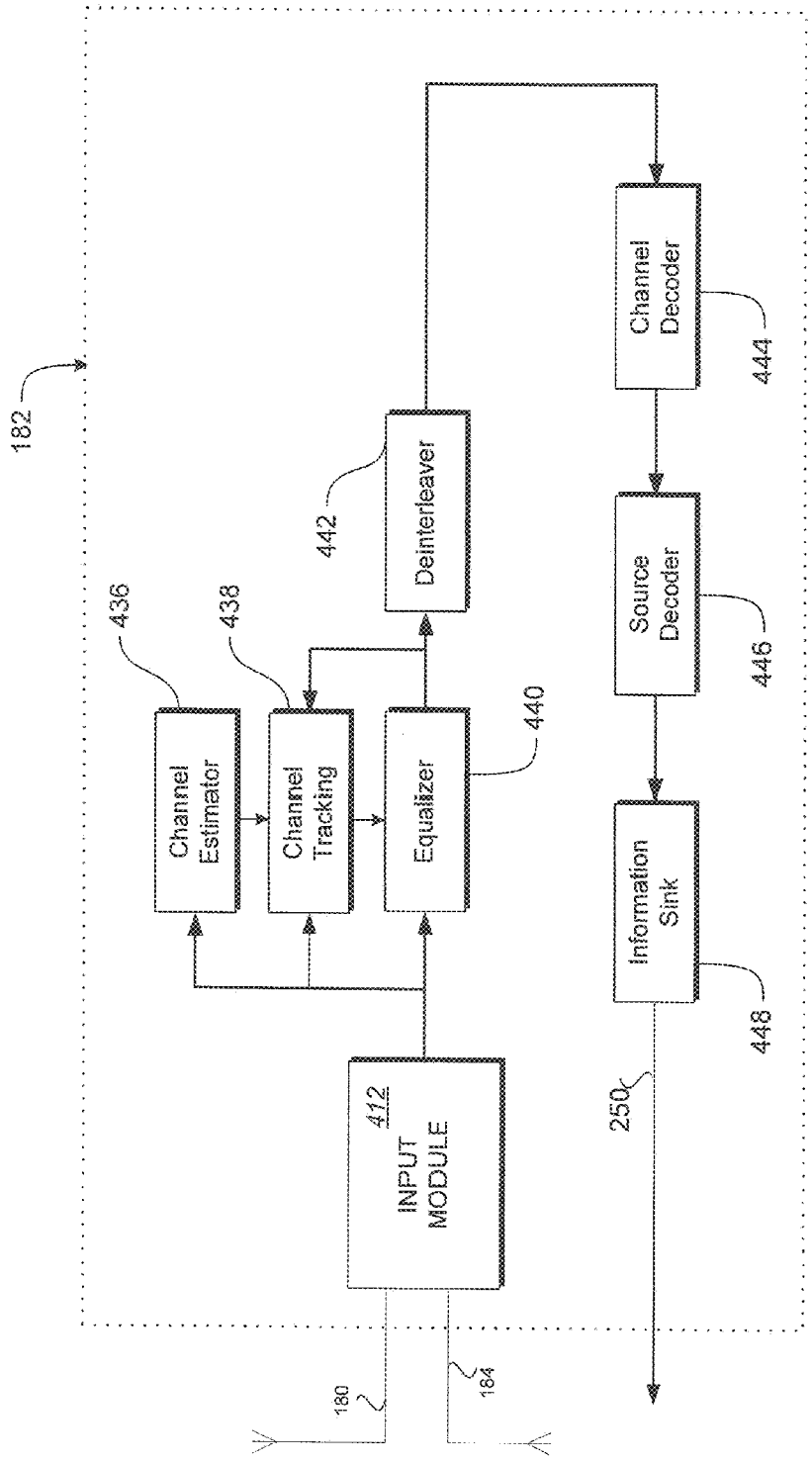
FIG. 4 illustrates part of a transceiver with equalizer for processing pilot tones and data tones in accordance with an embodiment.

FIG. 4 illustrates part of a transceiver 182 with equalizer for processing pilot tones and data tones in accordance with an embodiment. Transceiver 182 may comprise one or more antennas, including a first antenna 180 and a second antenna 184, an input module 412, an adaptive equalizer 440 running an equalizer application or instructions, and a channel estimator 436.

Input module 412 includes an interface to provided signals to adaptive equalizer 440 and other circuits from antennas 180 and 184. Input module 412 may comprise filters, delay elements, and taps with their corresponding coefficients to provide an output which depends on the instantaneous state of the radio channel.

The tap coefficients are weight values which may be adjusted based on the pilot tones to achieve a specific level of performance, and preferably to optimize signal quality at the receiver. In the preferred embodiment, the receiving system is able to track channel changes over time (i.e., using the pilot tones to update the equalizer taps) because of the rotation of the pilot tones through each of the OFDM subcarriers over the packet through time. As noted above, the pilot tones are separated by some number of data subcarriers so that estimation of slope and intercept for subcarrier tracking could be maintained. As the pilot tones are swept across the band, the taps for the equalizer for the subcarriers for which the pilot tones currently populate may be updated as well.

The pilot tones 210 may be received at one of the antennas 180 and 184, and converted to a baseband representation by input module 412. The received pilot tones are then input into the channel estimator 436 which uses the received sequences to determine initial channel estimates for the wireless channel (using, for example, a least squares approach). The channel estimator 436 may have a priori knowledge of the transmitted pilot tones, which it compares to the received signals to determine the initial channel estimates. The initial channel estimates may then be delivered to the channel tracking unit 438. The data signals may be received by one of the antennas 180 184 and converted to a baseband representation within the transceiver 182 input module 412. The data signals are then delivered to the input of the equalizer 440, which filters the signals in a manner dictated by the channel taps currently being applied to the equalizer 440. The equalizer 440 may include any type of equalizer structure (including, for example, a transversal filter, a maximum likelihood sequence estimator (MLSE), and others). When properly configured, the equalizer 440 may reduce or eliminate undesirable channel effects within the received signals (e.g., inter-symbol interference).

The received data signals with pilot tones 210 are also delivered to the input of the channel tracking unit 438, which uses the received signals to track the channel taps applied to the equalizer 440. During system operation, these taps are regularly updated by the channel tracking unit 438 based on the magnitude and phase of the pilot tones. In addition to the receive data, the channel tracking unit 438 also receives data from an output of the equalizer 440 as feedback for use in the channel tracking process. The channel tracking unit 438 uses the initial channel estimates determined by the channel estimator 436 to determine the channel taps covariance matrix (C). The channel tracking unit 438 then determines the value of the constant b (related to the channel changing rate) and calculates the taps changing covariance matrix (b*C). The square root of the taps changing covariance matrix is then determined and used within a modified least mean square (LMS) algorithm to determine the updated channel taps, which are then applied to the equalizer 440. The output of the equalizer 440 is de-interleaved in the de-interleaver 442. Channel and source coding is then removed from the signal in the channel decoder 444 and the source decoder 446, respectively. The resulting information is then delivered to the information sink 448, which may include a user device, a memory, or other data destination as shown by output 250.

FIG. 5 is a flowchart of a method for tone allocation in a transmitter in accordance to an embodiment. Method 500 begins with action 510 and is repeated for every packet. In action 510, a device, such as the exemplary communication device 172 in FIG. 1B, wirelessly transmits a packet using a plurality of subcarriers that may include pilot, data, and null tones. Control is then passed to action 520 where the process assigns one or more pilot tones to the plurality of subcarriers. The assignment of the one or more pilot tones in action 520 is done in conjunction with action 530 such that the one or more pilot tones sweep through the one or more usable subcarriers over time. Control is then cycled back to action 510 where wireless communication continues to be conducted by the communication device. The assigning of the pilot tones, as noted earlier could be: (1) sequential; (2) random; (3) in a manner that avoids positioning the pilot tones adjacent nulled subcarriers; and/or (4) according to (a) certain channel conditions, (b) a length of a packet, and/or (c) a modulation order type (including one that is below 64 QAM). The channel conditions may include a modulation and coding scheme.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Various processes to support the establishment of channel estimation and tracking, using the disclosed approach, may provide efficient and productive use of computing resources in a communication device to track channel changes over time by assigning one or more pilot tones to a packet. Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method of transmitting in a wireless network, the method comprising:
   sweeping positions of first and second pilot tones in a plurality of subcarriers between a plurality of symbols of a packet, while avoiding a positioning of the first and second pilot tones adjacent nulled subcarriers or adjacent subcarriers that are adjacent the nulled subcarriers, a symbol of the plurality of symbols including the first and second pilot tones, a plurality of data subcarriers, a plurality of guard subcarriers, and a Direct Current (DC) subcarrier; and
   transmitting the packet in a 1 Mega Hertz bandwidth.

2. The method of claim 1, wherein sweeping the positions of the first and second pilot tones includes sequentially sweeping the positions of the first and second pilot tones.

3. The method of claim 1, wherein the nulled subcarriers include at least one subcarrier selected from the group consisting of the plurality of guard subcarriers and the DC subcarrier.

4. The method of claim 1, wherein sweeping the positions of the first and second pilot tones includes sweeping in a non-sequential manner the positions of the first and second pilot tones.

5. The method of claim 1, further comprising:
   selecting the positions of the first and second pilot tones based on one or more channel conditions.

6. The method of claim 1 comprising positioning the first and second pilot tones according to a modulation and coding scheme.

7. The method of claim 1, wherein sweeping the positions of the first and second pilot tones includes sweeping the positions of the first and second pilot tones based on a modulation order type.

8. The method of claim 7, wherein sweeping the positions of the first and second pilot tones includes positioning the first and second pilot tones at subcarriers having a modulation order type below 64 Quadrature Amplitude Modulation (QAM).

9. The method of claim 1, wherein the wirelessly transmitting is according to an Institute of Electrical and Electronics Engineers (IEEE) 802.11ah specification.

10. A method of transmitting in a wireless network, the method comprising:
    sweeping positions of first and second pilot tones in a plurality of subcarriers between a plurality of symbols of a packet, a symbol of the plurality of symbols including the first and second pilot tones, a plurality of data subcarriers, a plurality of guard subcarriers, and a Direct Current (DC) subcarrier, the sweeping positions of the first and second pilot tones comprising selecting, based on one or more channel conditions, the positions of the first and second pilot tones such that an amount of time a pilot tone occupies a subcarrier depends on at least one parameter selected from the group consisting of the channel conditions and a length of the packet; and
    transmitting the packet in a 1 Mega Hertz bandwidth.

11. The method of claim 10, wherein sweeping the positions of the first and second pilot tones includes sweeping in a non-sequential manner the positions of the first and second pilot tones.

12. An apparatus to transmit in a wireless network, the apparatus comprising:
    a transceiver configured to sweep positions of first and second pilot tones in a plurality of subcarriers between a plurality of symbols of a packet, the transceiver to avoid a positioning of the first and second pilot tones adjacent nulled subcarriers or adjacent subcarriers that are adjacent nulled subcarriers, a symbol of the plurality of symbols including the first and second pilot tones, a plurality of data subcarriers, a plurality of guard subcarriers, and a Direct Current (DC) subcarrier; and
    one or more antennas operably coupled to the transceiver to transmit the packet in a 1 Mega Hertz bandwidth.

13. The apparatus of claim 12, wherein the transceiver is to sequentially sweep the positions of the first and second pilot tones in the plurality of subcarriers between the plurality of symbols.

14. The apparatus of claim 12, wherein the nulled subcarriers include at least one subcarrier selected from the group consisting of a guard subcarrier and the DC subcarrier.

15. The apparatus of claim 12, wherein the transceiver is to sweep in a non-sequential manner the positions of the first and second pilot tones in the plurality of subcarriers between the plurality of symbols.

16. The apparatus of claim 12, wherein the transceiver is to select the positions of the first and second pilot tones based on one or more channel conditions.

17. The apparatus of claim 12, wherein the transceiver is to select the positions of the first and second pilot tones according to a modulation and coding scheme.

18. The apparatus of claim 12, wherein the transceiver is to position the first and second pilot tones based on a modulation order type.

19. The apparatus of claim 18, wherein the transceiver is to position the first and second pilot tones at subcarriers having a modulation order type below 64 Quadrature Amplitude Modulation (QAM).

20. The apparatus of claim 12, wherein the transceiver is to transmit the packet according to an Institute of Electrical and Electronics Engineers (IEEE) 802.11ah specification.

21. An apparatus to transmit in a wireless network, the apparatus comprising:
   a transceiver configured to sweep positions of first and second pilot tones in a plurality of subcarriers between a plurality of symbols of a packet, the transceiver to select the positions of the first and second pilot tones, based on one or more channel conditions, such that an amount of time a pilot tone occupies a subcarrier depends on at least one parameter selected from a group consisting of the channel conditions and a length of the packet, a symbol of the plurality of symbols including the first and second pilot tones, a plurality of data subcarriers, a plurality of guard subcarriers, and a Direct Current (DC) subcarrier; and
   one or more antennas operably coupled to the transceiver to transmit the packet in a 1 Mega Hertz bandwidth.

22. The apparatus of claim 21, wherein the transceiver is to sweep in a non-sequential manner the positions of the first and second pilot tones in the plurality of subcarriers between the plurality of symbols.

23. A non-transitory machine-accessible medium that is to provide instructions, which when accessed, cause a machine to perform operations, the non-transitory machine-accessible medium comprising:
   code to cause at least one computer to sweep positions of first and second pilot tones in a plurality of subcarriers between a plurality of symbols of a packet, while avoiding a positioning of the first and second pilot tones adjacent nulled subcarriers or adjacent subcarriers that are adjacent the nulled subcarriers, a symbol of the plurality of symbols including the first and second pilot tones, a plurality of data subcarriers, a plurality of guard subcarriers, and a Direct Current (DC) subcarrier; and
   code to cause the at least one computer to wirelessly transmit the packet in a 1 Mega Hertz bandwidth.

24. The non-transitory machine-accessible medium of claim 23 comprising code to cause the at least one computer to sequentially sweep the positions of the first and second pilot tones.

25. The non-transitory machine-accessible medium of claim 23, wherein the nulled subcarriers include at least one subcarrier selected from the group consisting of a guard subcarrier and the DC subcarrier.

26. The non-transitory machine-accessible medium of claim 23 comprising code to cause the at least one computer to sweep in a non-sequential manner the positions of the first and second pilot tones.

27. The non-transitory machine-accessible medium of claim 23, further comprising code to cause the computer to select the positioning of the first and second pilot tones based on one or more channel conditions.

28. The non-transitory machine-accessible medium of claim 23 comprising code to cause the computer to position the first and second pilot tones according to a modulation and coding scheme.

29. The non-transitory machine-accessible medium of claim 23 comprising code to cause the computer to position the first and second pilot tones based on a modulation order type.

30. The non-transitory machine-accessible medium of claim 29 comprising code to cause the computer to position the first and second pilot tones at subcarriers having a modulation order type below 64 Quadrature Amplitude Modulation (QAM).

31. The non-transitory machine-accessible medium of claim 23 comprising code to cause the computer to wirelessly transmit the packet according to an Institute of Electrical and Electronics Engineers (IEEE) 802.11 ah specification.

32. A non-transitory machine-accessible medium that is to provide instructions, which when accessed, cause a machine to perform operations, the non-transitory machine-accessible medium comprising:
   code to cause at least one computer to sweep positions of first and second pilot tones in a plurality of subcarriers between a plurality of symbols of a packet, the code to cause the computer to select the positioning of the first and second pilot tones, based on one or more channel conditions, such that an amount of time a pilot tone occupies a subcarrier depends on at least one parameter selected from the group consisting of the channel conditions and a length of the packet, a symbol of the plurality of symbols including the first and second pilot tones, a plurality of data subcarriers, a plurality of guard subcarriers, and a Direct Current (DC) subcarrier; and
   code to cause the at least one computer to wirelessly transmit the packet in a 1 Mega Hertz bandwidth.

33. The non-transitory machine-accessible medium of claim 32 comprising code to cause the at least one computer to sweep in a non-sequential manner the positions of the first and second pilot tones.

* * * * *